United States Patent
Ma et al.

(10) Patent No.: US 10,162,230 B2
(45) Date of Patent: Dec. 25, 2018

(54) ARRAY SUBSTRATE, DISPLAY PANEL AND DISPLAY DEVICE INCLUDING THE SAME

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Yangzhao Ma, Xiamen (CN); Ling Wu, Xiamen (CN); Boping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 118 days.

(21) Appl. No.: 15/242,863

(22) Filed: Aug. 22, 2016

(65) Prior Publication Data
US 2017/0329187 A1  Nov. 16, 2017

(30) Foreign Application Priority Data
May 16, 2016  (CN) .......................... 2016 1 0325494

(51) Int. Cl.
*G02F 1/1343*  (2006.01)
*G02F 1/1335*  (2006.01)
(Continued)

(52) U.S. Cl.
CPC ...... *G02F 1/134336* (2013.01); *G02F 1/1337* (2013.01); *G02F 1/1368* (2013.01);
(Continued)

(58) Field of Classification Search
None
See application file for complete search history.

(56) References Cited

U.S. PATENT DOCUMENTS 5,638,201 A * 6/1997 Bos ................... G02F 1/133753
349/128
7,215,386 B2 * 5/2007 Hong ................... G02F 1/1393
349/129
(Continued)

OTHER PUBLICATIONS

CN First Office Action dated Jun. 14, 2018 in the corresponding CN application (application No. 201610325404.X).

*Primary Examiner* — Edward Glick
*Assistant Examiner* — David Chung
(74) *Attorney, Agent, or Firm* — Kilpatrick Townsend & Stockton LLP

(57) ABSTRACT

An array substrate, and a display panel and a display device are provided. The array substrate includes a base substrate, pixel units disposed on the base substrate, and a first and a second electrodes disposed within the pixel units. The first electrode is disposed above the second electrode and comprises a strip-shaped first opening area having a first and a second ends and extending along a first direction. An orthogonal projection of a transmitting area of the pixel units to the base substrate covers an orthogonal projection of a part of the first opening area. An orthogonal projection of a non-transmitting area of the pixel units covers orthogonal projections of the first end and second ends to the base substrate. In this way, an electric field component resulting in disordered rotation of liquid crystal molecules is located in the non-transmitting area of the pixel units.

17 Claims, 12 Drawing Sheets

(51) Int. Cl.
*G02F 1/1337* (2006.01)
*G02F 1/1362* (2006.01)
*G02F 1/1368* (2006.01)

(52) U.S. Cl.
CPC .. *G02F 1/133514* (2013.01); *G02F 1/134363* (2013.01); *G02F 1/136286* (2013.01); *G02F 2001/134372* (2013.01); *G02F 2001/136222* (2013.01)

(56) References Cited

U.S. PATENT DOCUMENTS

| | | | |
|---|---|---|---|
| 8,059,242 B2 * | 11/2011 | Onogi | G02F 1/134363 349/129 |
| 2012/0218501 A1 * | 8/2012 | Lee | G02F 1/134363 349/139 |
| 2014/0063429 A1 * | 3/2014 | Huh | G02F 1/133707 349/139 |
| 2014/0240629 A1 * | 8/2014 | Zhou | G02F 1/134363 349/43 |

* cited by examiner

ARRAY SUBSTRATE, DISPLAY PANEL AND DISPLAY DEVICE INCLUDING THE SAME

TECHNICAL FIELD

This disclosure generally relates to display technology, and in particular, to an array substrate, a display panel and a display device including the same.

BACKGROUND

A liquid crystal display panel generally includes an array substrate, a color film substrate disposed opposite to the array substrate, and a liquid crystal layer formed between the array substrate and the color film substrate. The array substrate includes a plurality of pixel areas arranged in an array, and a pixel electrode and a common electrode are formed in each of the pixel areas. By applying different voltages to the pixel electrode and the common electrode, the liquid crystal molecules in the liquid crystal layer may rotate accordingly, so that the display panel displays a predetermined image.

In some liquid crystal display panels in the prior art, the common electrode is disposed above the pixel electrode. As shown in FIG. 1, the common electrode 100 may be provided with a strip-shaped opening 110. When different voltages are applied to the pixel electrode and the common electrode 100, an electric field parallel to the array substrate is generated between the common electrode 100 and the pixel electrode through the strip-shaped opening 110, for example, the electric field Ex parallel to the x-axis direction as shown in FIG. 2. Under the effect of the above electric field, the liquid crystal molecules twist an angle θ. However, as shown in FIG. 1, at the end of a pixel transmitting area 12, i.e., at the two ends 111 and 112 of the strip-shaped opening, the electric field generated between the pixel electrode and the common electrode 100 may be decomposed as an x-axis component Ex and a y-axis component Ey as shown in FIG. 2. Due to the differences in the distance between the pixel electrode and the common electrode 100, and in structure and other details thereof over the length, the components Ex and Ey have different values in different regions at the ends, leading to an uneven electric field and disordered rotation of the liquid crystal molecules. Moreover, when an external force is applied onto the liquid crystal display panel, the liquid crystal molecules near the ends of the pixel transmitting area 12, i.e., at the two ends 111 and 112 of the strip-shaped opening will twist under the effect of the external force, thereby forming a dark domain line at this position, which will not disappear within a long period of time after the external force is withdrawn, such that the tailing phenomenon of the liquid crystal display panel is predominant and the displaying effect is impacted.

SUMMARY

In view of the above-mentioned drawbacks in the prior art, it is expected to provide an array substrate, and a display panel and a display device including the same, in order to solve at least a part of the technical problems stated in the background.

In a first aspect, the present disclosure provides an array substrate, which includes a base substrate, a plurality of pixel units disposed on the base substrate, and a first electrode and a second electrode disposed within the pixel units. The first electrode is disposed above the second electrode. The first electrode comprises a strip-shaped first opening area extending along a first direction. The first opening area comprises a first end and a second end. An orthogonal projection of a transmitting area of the pixel units to the base substrate covers an orthogonal projection of a part of the first opening area between the first end and the second end to the base substrate. An orthogonal projection of a non-transmitting area of the pixel units to the base substrate covers orthogonal projections of the first end and the second end to the base substrate.

In a second aspect, the present disclosure further provides a display panel comprising the array substrate stated above, a color film substrate disposed opposite to the array substrate, and a liquid crystal layer disposed between the array substrate and the color film substrate.

In a third aspect, the present disclosure further provides a display device, which includes the above display panel.

In the solution of the present disclosure, the two ends of the first opening area of the first electrode in the array substrate are disposed within the non-transmitting area of the pixel unit, and a part of the first opening area between the two ends is disposed within the transmitting area of the pixel unit, such that an electric field component leading to disordered rotation of the liquid crystal molecules, in the electric field formed between the first electrode and the second electrode through the first opening area of the first electrode, is located within the non-transmitting area, thereby overcoming the tailing phenomenon of the transmitting area of the pixel units. In addition, with the solution of the present disclosure, the tailing phenomenon generated by the external force can be eliminated quickly after the external force disappears, thereby improving the displaying effect.

BRIEF DESCRIPTION OF THE DRAWINGS

By reading the detailed description on the non-restrictive embodiments with reference to the accompany drawings, other features, objectives, and advantages of the present disclosure will become more apparent.

DETAILED DESCRIPTION OF EMBODIMENTS

Figure 1:
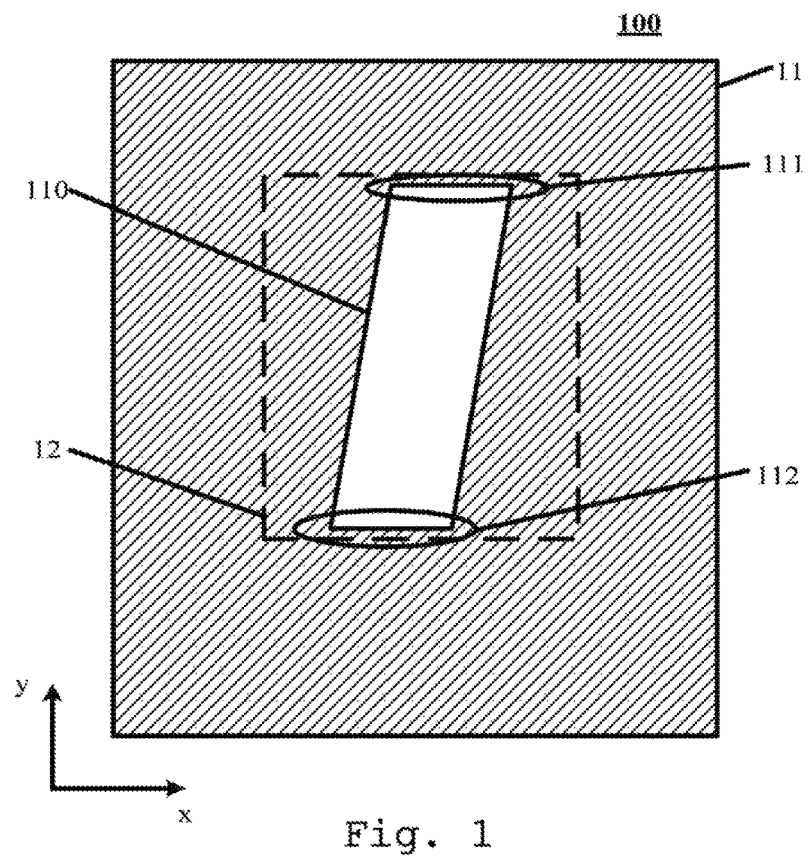
FIG. 1 shows a schematic structural view of a common electrode in the prior art.

Hereinafter, the embodiments of the present disclosure will be described in conjunction with the accompanying drawings. It should be understood that the specific embodiments are merely used for illustrating the application, without making limitations thereto. Further, to facilitate description of the application, only portions related to the application are shown in the drawings.

Moreover, the embodiments in the present disclosure, as well as the features in the embodiments, may be combined with each other if there is no conflict. Hereinafter, the present disclosure will be described in details according to the accompanying drawings in conjunction with the embodiments.

Figure 3A:
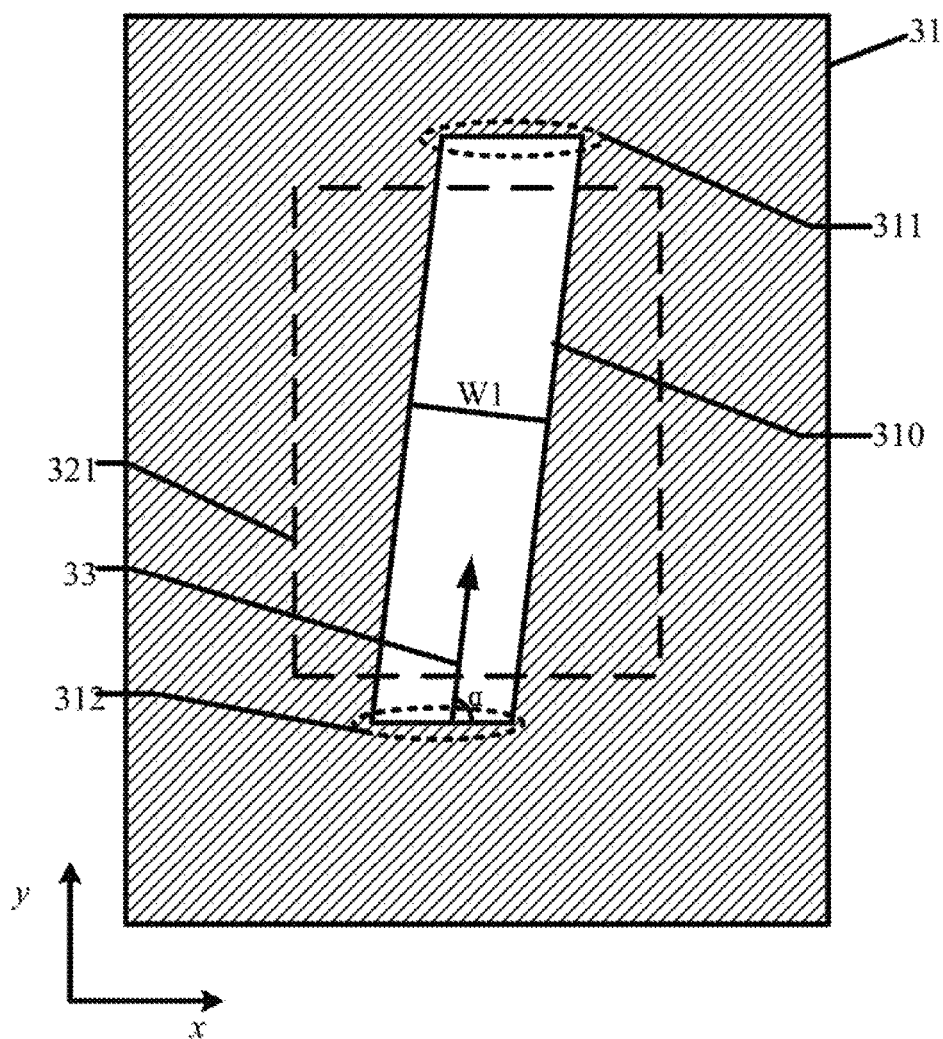
FIG. 3A shows a schematic structural view of a first electrode according to one embodiment.

FIG. 3A illustrates a schematic structure of the first electrode in the array substrate according to one embodiment of the present disclosure.

In this embodiment, the array substrate includes a base substrate, a plurality of scan lines and a plurality of data lines disposed on the base substrate and intersecting with each other, and pixel units, each formed by two adjacent scan lines and two adjacent data lines. The pixel unit includes a thin film transistor disposed at the intersection point of the data line and the scan line, a second electrode connected to a drain electrode/source electrode of the thin film transistor, and a first electrode disposed above the second electrode. Each of the pixel units includes a transmitting area and a non-transmitting area. In this embodiment, the extension direction of the scan lines is for example parallel to the x-axis direction, and the extension direction of the data lines is for example parallel to the y-axis direction.

In this embodiment, the first electrode is a common electrode, and the second electrode is a pixel electrode.

Figure 3B:
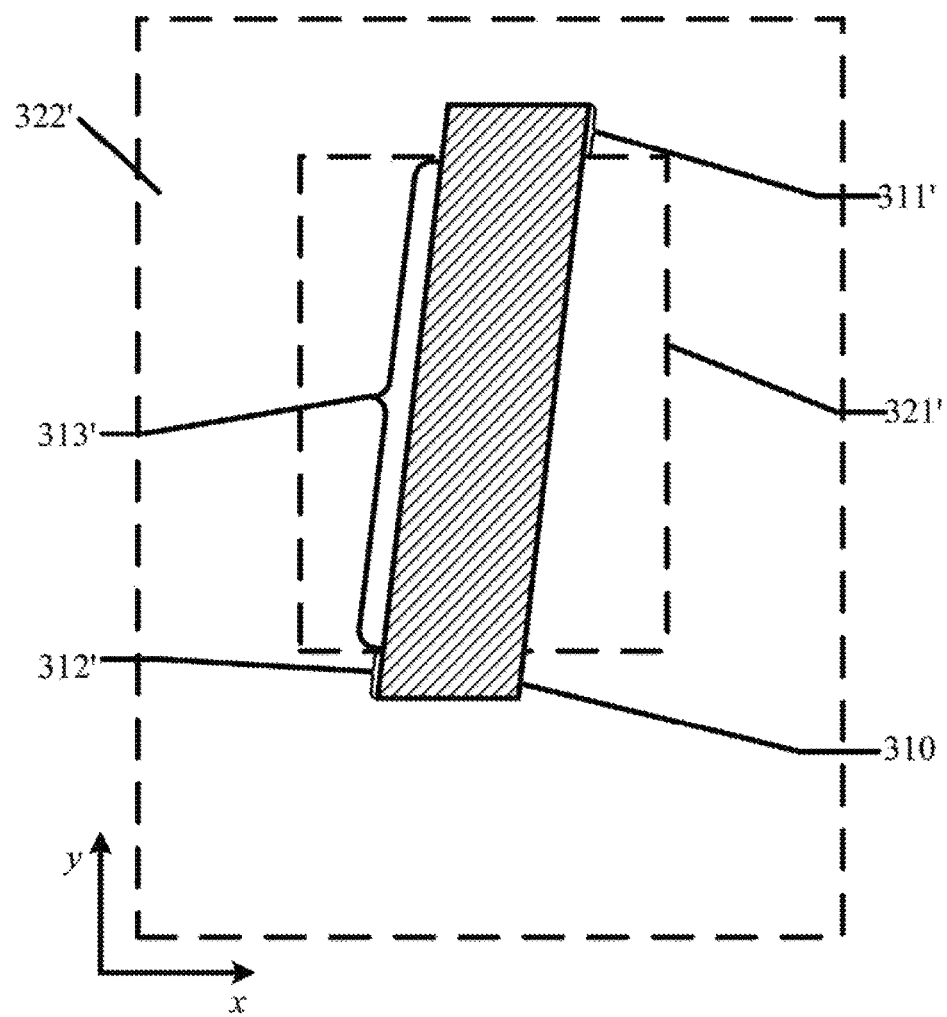
FIG. 3B shows a schematic spatial relationship between the orthogonal projection of a first opening area to the base substrate in FIG. 3A and the orthogonal projections of a transmitting area and a non-transmitting area of the pixel unit to the base substrate.

As shown in FIG. 3A, the first electrode 31 includes a strip-shaped first opening area 310 extending along a first direction 33. The first opening area 310 includes two ends, a first end 311 and a second end 312. In addition, a transmitting area 321 of the pixel unit is marked with a dotted line in FIG. 3A. The spatial relationship between the first opening area 310 and the transmitting area 321 and the non-transmitting area of the pixel unit is shown in FIG. 3B. FIG. 3B illustrates the spatial relationship between the orthogonal projection of the first opening area (as shown in FIG. 3A) to the base substrate and the orthogonal projections of the transmitting area and the non-transmitting area of the pixel unit to the base substrate. In FIG. 3B, the orthogonal projection 321' of the transmitting area 321 of the pixel unit to the base substrate covers the orthogonal projection 313' of the part of the first opening area 310 between the first end 311 and the second end 312 to the base substrate. In addition, the orthogonal projection 322' of the non-transmitting area of the pixel unit to the base substrate covers the orthogonal projections 311' and 312' of the first end 311 and the second end 312 of the first opening area 310 to the base substrate. That is, the first end 311 and the second end 312 of the first opening area 310 are separated from the transmitting area 321 of the pixel unit.

Figure 2:
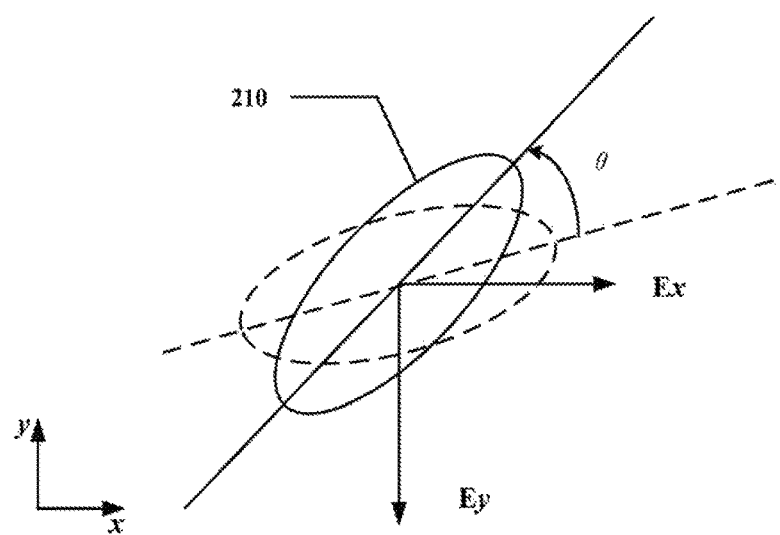
FIG. 2 shows a schematic view of twist of liquid crystal molecules under the effect of an electric field formed between a pixel electrode and a common electrode by using the common electrode shown in FIG. 1.

In this embodiment, in contrast to the prior art shown in FIGS. 1 and 2, the first end 311 and the second end 312 of the first opening area 310 of the first electrode 31 are disposed in the non-transmitting area of the pixel unit, such that the electric field parallel to the y-axis direction formed between the first end 311 of the second electrode and the first electrode 31, and between the second end 312 of the second electrode and the first electrode 31 after being powered up is separated from the transmitting area 321 of the pixel unit. The impact of the electric field parallel to the y-axis direction on the liquid crystal molecules in the transmitting area is reduced, and the tailing phenomenon at the end of the pixel transmitting area can be avoided.

Figure 4:
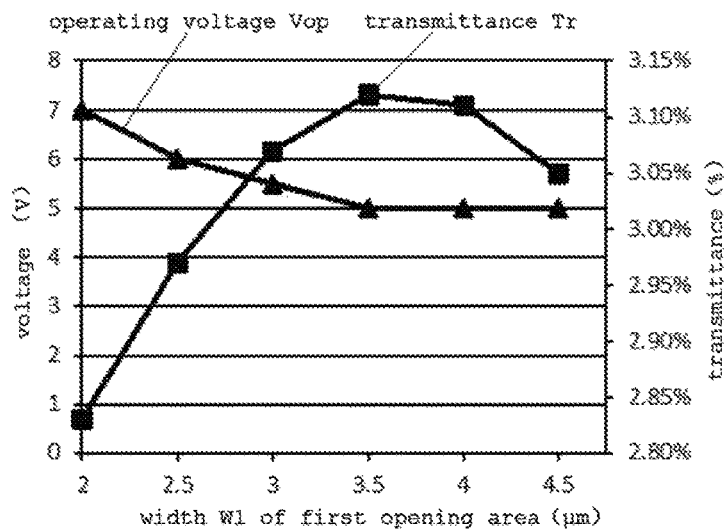
FIG. 4 shows a schematic relationship between the width of the first opening area in FIG. 3A and the transmittance and operating voltage of the pixel unit.

In some alternative implementations of this embodiment, the width W1 of the strip-shaped first opening area 310 (as shown in FIG. 3A) may be configured to be 1.5 μm-4.5 μm. The width W1 of the strip-shaped first opening area 310 is closely associated with the transmittance and operating voltage of the pixel unit. FIG. 4 illustrates a relationship between the width of the first opening area of FIG. 3A and the transmittance and operating voltage of the pixel unit. As shown in FIG. 4, when the width W1 of the strip-shaped first opening area is between 2 μm and 3.5 μm, the transmittance Tr % of the pixel units increases when W1 increases. When W1 is between 3.5 μm and 4.5 μm, the transmittance Tr % of the pixel units decreases when W1 increases. Moreover, as shown in FIG. 4, when W1 is between 2 μm and 3.5 μm, the operating voltage Vop of the pixel units decreases when W1 increases. When W1 is between 3.5 μm and 4.5 μm, the operating voltage Vop of the pixel units remains substantially unchanged with the increase of W1. It can be seen from FIG. 4 that, when the width W1 of the first opening area is greater than or equal to 3 μm and less than or equal to 4 μm, the pixel units have both a high light transmittance and a low operating voltage. Therefore, the width W1 of the first opening area can be preferably configured to be between 3 μm and 4 μm.

In some embodiments, as shown in FIG. 3A, the angle α between the first direction 33 and the direction parallel to the x axis satisfies: $75°≤α≤86°$. In this way, assuming that an alignment direction of an alignment layer above the first electrode 31 is parallel to the x-axis direction, the direction of the electric field formed between the first electrode 31 and the second electrode through the first opening area 310 of the first electrode 31 is angled to the alignment direction, the angle being in the range of 4°-15°. In the presence of the angle between the alignment direction and the electric field formed between the first electrode and the second electrode, under the effect of the electric field formed due to the power up of the first electrode and the second electrode, the liquid crystal molecules may quickly twist to a certain direction, thereby speeding up the response of the display panel.

Figure 5A:
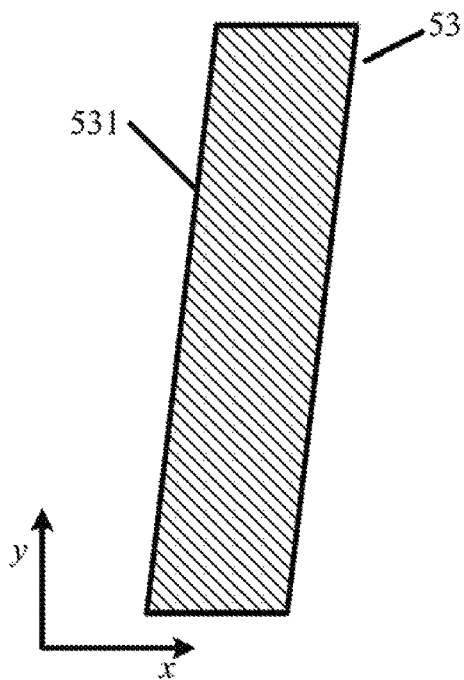
FIG. 5A shows a schematic structural view of a second electrode.
Figure 5B:
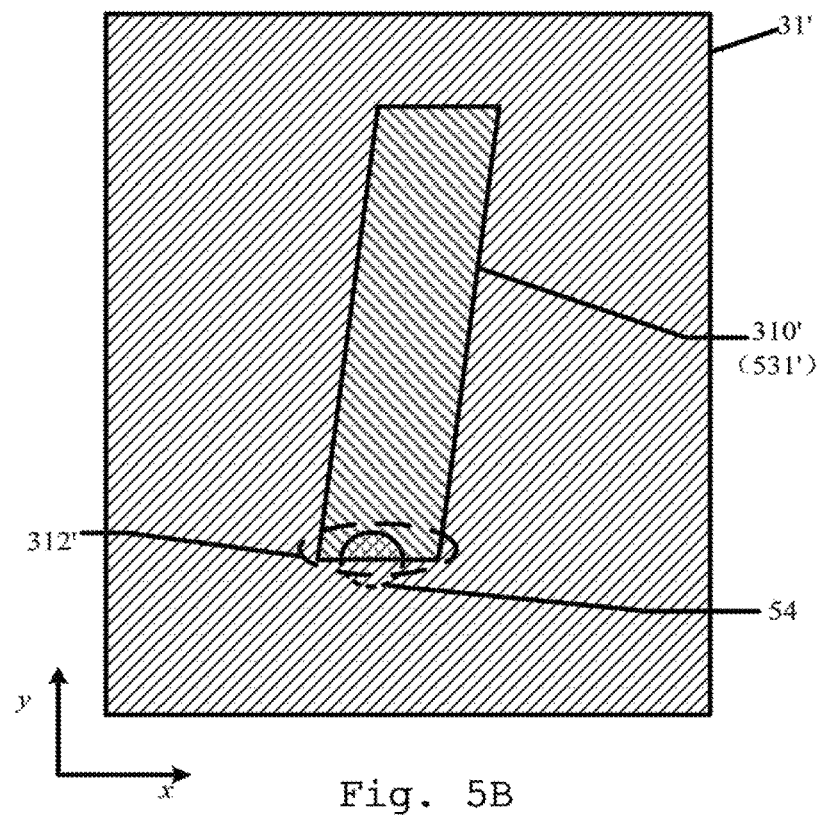
FIG. 5B shows a spatial relationship between the orthogonal projections of the first electrode and its first opening area to the base substrate as shown in FIG. 3A and the orthogonal projection of a first branch electrode of the second electrode to the base substrate as shown in FIG. 5A.

In some embodiments, a schematic structure of the second electrode is shown in FIG. 5A. The second electrode 53 may include a strip-shaped first branch electrode 531. FIG. 5B shows a spatial relationship between the orthogonal projections of the first electrode and its first opening area to the base substrate as shown in FIG. 3A and the orthogonal projection of the first branch electrode of the second electrode to the base substrate as shown in FIG. 5A. As shown in FIG. 5B, the orthogonal projection 531' of the first branch electrode 531 of the second electrode 53 to the base substrate falls within the orthogonal projection 31' of the first electrode 31 to the base substrate, and coincides with the orthogonal projection 310' of the first opening area 310 of the first electrode 31 to the base substrate. That is, the area covered by the first branch electrode 531 of the second electrode 53 is exactly equal to the area covered by the first opening area 310 of the first electrode 31. In this way, an electric field parallel to the base substrate can be formed between the second electrode and the first electrode 31 through the first opening area 310 of the first electrode 31.

Figure 5C:
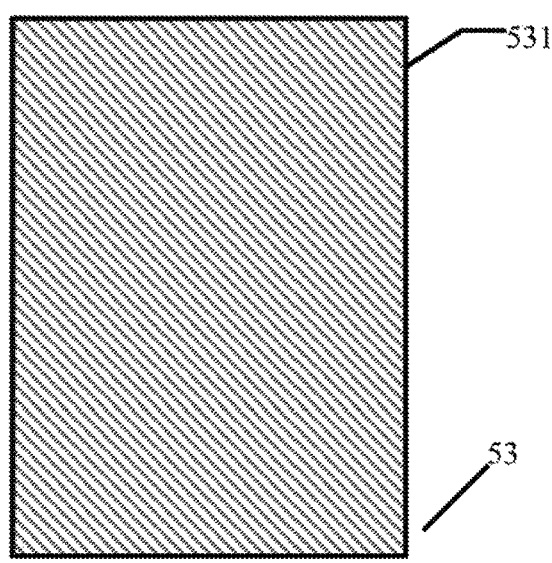
FIG. 5C shows another schematic structural view of the second electrode.
Figure 5D:
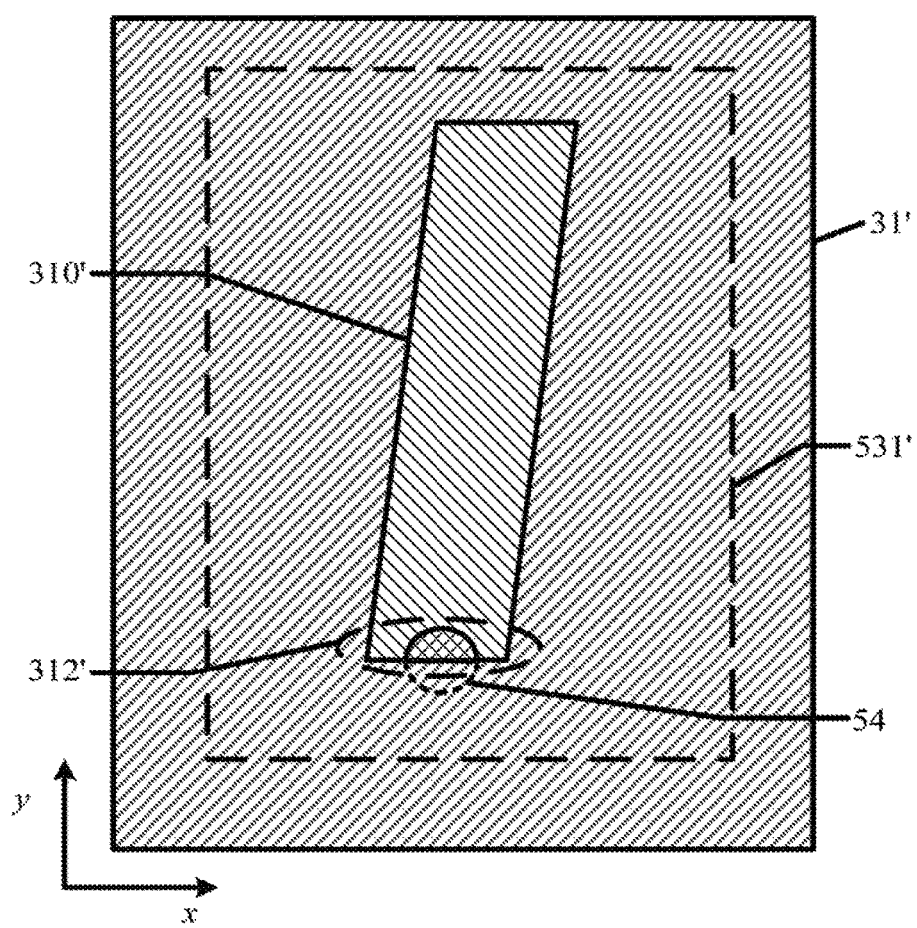
FIG. 5D shows a spatial relationship between the orthogonal projections of the first electrode and its first opening area to the base substrate as shown in FIG. 3A and the orthogonal projection of the first branch electrode of the second electrode to the base substrate as shown in FIG. 5C.

In some embodiments, another schematic structure of the second electrode is shown in FIG. 5C. The second electrode 53 may include a rectangle-shaped first branch electrode 531. FIG. 5D shows a spatial relationship between the orthogonal projections of the first electrode and its first opening area to the base substrate as shown in FIG. 3A and the orthogonal projection of the first branch electrode of the second electrode to the base substrate as shown in FIG. 5C. As shown in FIG. 5D, the orthogonal projection 531' of the first branch electrode 531 of the second electrode 53 to the base substrate falls within the orthogonal projection 31' of the first electrode 31 to the base substrate, and covers at least the orthogonal projection 310' of the first opening area 310 of the first electrode 31 to the base substrate. That is, the area covered by the first branch electrode 531 of the second electrode 53 is greater than the area covered by the first opening area 310 of the first electrode 31. When the area covered by the first branch electrode 531 of the second electrode 53 is greater than the area covered by the first opening area 310 of the first electrode 31, it is conducive to the formation of a storage capacitor. The area covered by the first branch electrode 531 of the second electrode 53 can be set according to the requirements for the capacitance value of the storage capacitor.

It should be noted that FIGS. 5A to 5D illustrate the shape of the first branch electrode 531 of the second electrode 53 and the spatial relationship between the first branch electrode 531 of the second electrode 53 and the first opening area 310 of the first electrode 31 as shown in FIG. 3A. It will be understood that, the first branch electrode 531 of the second electrode 53 may have any shape, as long as the projection of the first branch electrode 531 to the base substrate covers the projection 310' of the first opening area 310 of the first electrode 31 to the base substrate, which is within the scope of the present disclosure.

In some embodiments, the second electrode is electrically connected to the drain electrode/source electrode of the thin film transistor via a through hole. As shown in FIGS. 5B and 5D, the projection 54 of the through hole to the base substrate at least partially covers the projection 312' of the second end 312 of the first opening area 310 of the first electrode 31 to the base substrate.

Figure 6A:
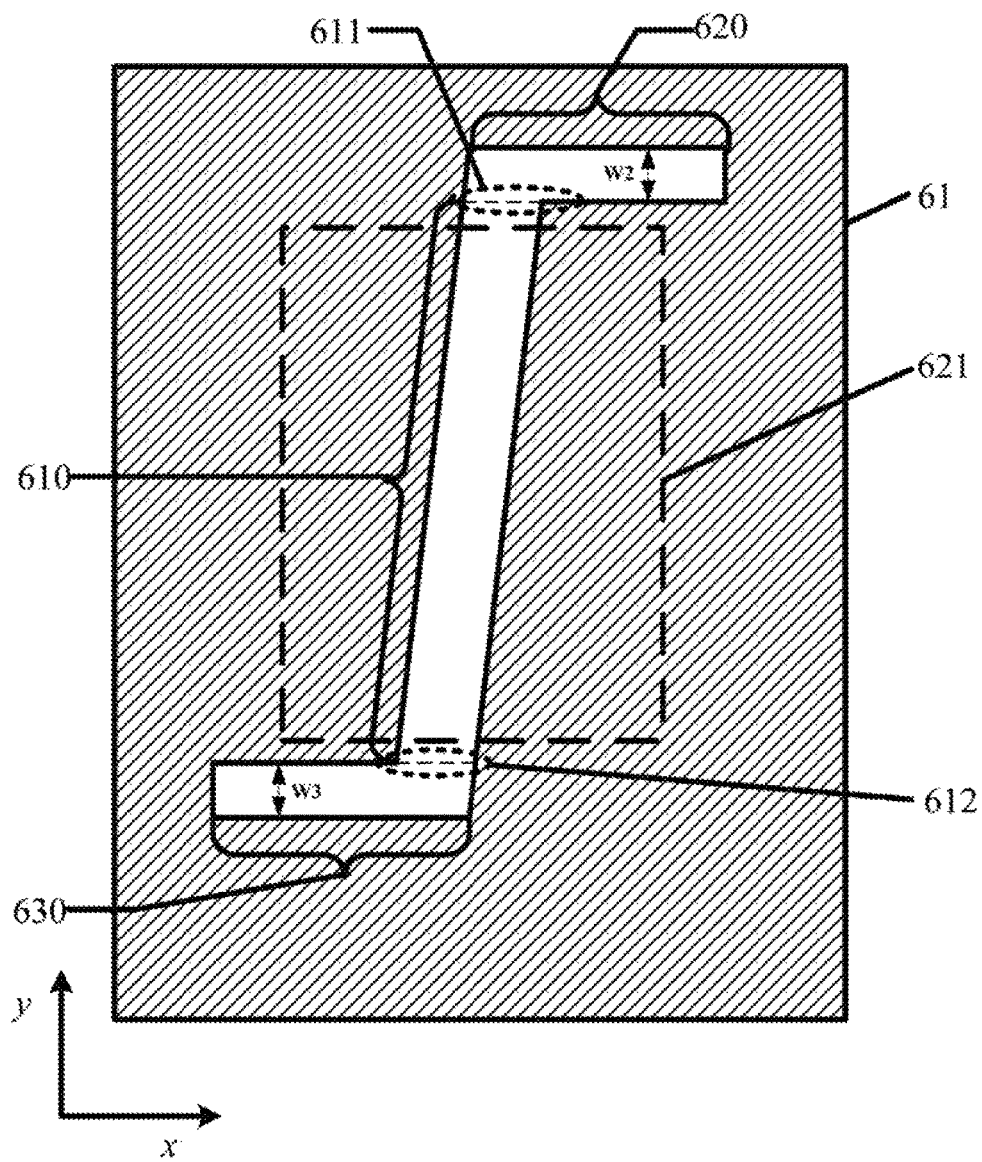
FIG. 6A shows a schematic structural view of the first electrode according to another embodiment.

FIG. 6A illustrates a schematic structure of the first electrode in the array substrate according to another embodiment of the present disclosure.

As in the embodiment shown in FIG. 3A, the array substrate according to this embodiment includes a base substrate, a plurality of scan lines and a plurality of data lines disposed on the base substrate and intersecting with each other, and pixel units, each formed by two adjacent scan lines and two adjacent data lines. The pixel unit includes a thin film transistor disposed at the intersecting point of the data line and the scan line, a second electrode connected to a drain electrode/source electrode of the thin film transistor, and a first electrode disposed above the second electrode. Each of the pixel units includes a transmitting area and a non-transmitting area. As in the embodiment shown in FIG. 3A, the extension direction of the scan lines in this embodiment is for example parallel to the x-axis direction, and the extension direction of the data lines is for example parallel to the y-axis direction.

Compared to FIG. 3A, the first electrode 61 shown in FIG. 6A further includes a strip-shaped second opening area 620 in communication with the first end 611 of the first opening area 610, and a strip-shaped third opening area 630 in communication with the second end 612 of the first opening area 610. As shown in FIG. 6A, the second opening area 620 and the third opening area 630 extend parallel to the x-axis direction, respectively. In some embodiments, the second opening area 620 and the third opening area 630 are respectively located on two opposite sides of the first opening area 610.

In some embodiments, the width W2 of the strip-shaped second opening area 620 is greater than or equal to 1.5 μm, and less than or equal to 4.5 μm. The width W3 of the strip-shaped third opening area 630 is greater than or equal to 1.5 μm, and less than or equal to 4.5 μm.

Figure 6B:
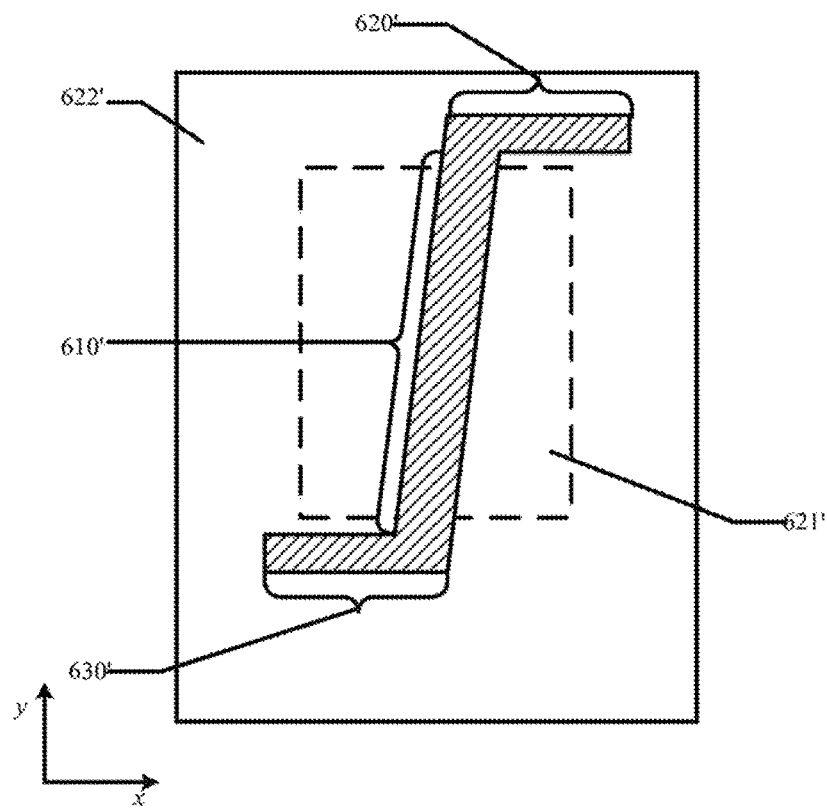
FIG. 6B shows a schematic spatial relationship between the orthogonal projections of the first opening area, a second opening area and a third opening area to the base substrate in FIG. 6A and the orthogonal projections of the transmitting area and the non-transmitting area of the pixel unit to the base substrate.

In those embodiments, the transmitting area 621 of the pixel unit is marked with a dotted line in FIG. 6A. The spatial relationship between the first opening area 610, the second opening area 620 and the third opening area 630 of the first electrode 61 and the transmitting area 621 and the non-transmitting area of the pixel unit is shown in FIG. 6B. FIG. 6B illustrates the spatial relationship between the orthogonal projections of the first opening area, the second opening area and the third opening area (as shown in FIG. 6A) to the base substrate and the orthogonal projections of the transmitting area and the non-transmitting area of the pixel unit to the base substrate. In FIG. 6B, the orthogonal projection 622' of the non-transmitting area of the pixel unit to the base substrate covers the orthogonal projections 620' and 630' of the second opening area 620 and the third opening area 630 to the base substrate. A part of the projection 610' of the first opening area 610 to the base substrate falls within the projection 621' of the transmitting area 621 of the pixel unit to the base substrate. In other words, the second opening area 620 and the third opening area 630 of the first electrode are located out of the transmitting area 621 of the pixel unit.

Compared to the embodiment shown in FIG. 3A, the first electrode 61 provided in this embodiment further includes the second opening area 620 and the third opening area 630 in communication with two respective ends 611 and 612 of the first opening area 610, and the second opening area 620 and the third opening area 630 are located within the non-transmitting area of the pixel unit. Since the second opening area 620 and the third opening area 630 extend along the direction parallel to the x-axis, the electric field parallel to the y-axis direction formed between the second electrode and the first electrode through the second opening area 620 and the third opening area 630 of the first electrode 61 is enhanced at the ends of the pixel unit. After the liquid crystal molecules near the ends of the pixel unit twist under the effect of an external force, the orientation of the liquid crystal molecules may be resumed to the alignment direction in a short time under the effect of the electric field parallel to the y-axis direction when the external force is withdrawn, such that the tailing problem is further addressed, and the displaying effect is further enhanced.

Figure 6C:
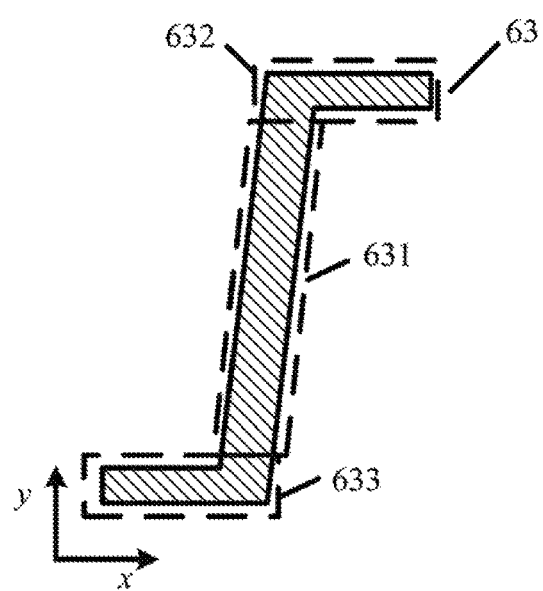
FIG. 6C shows still another schematic structural view of the second electrode.
Figure 6D:
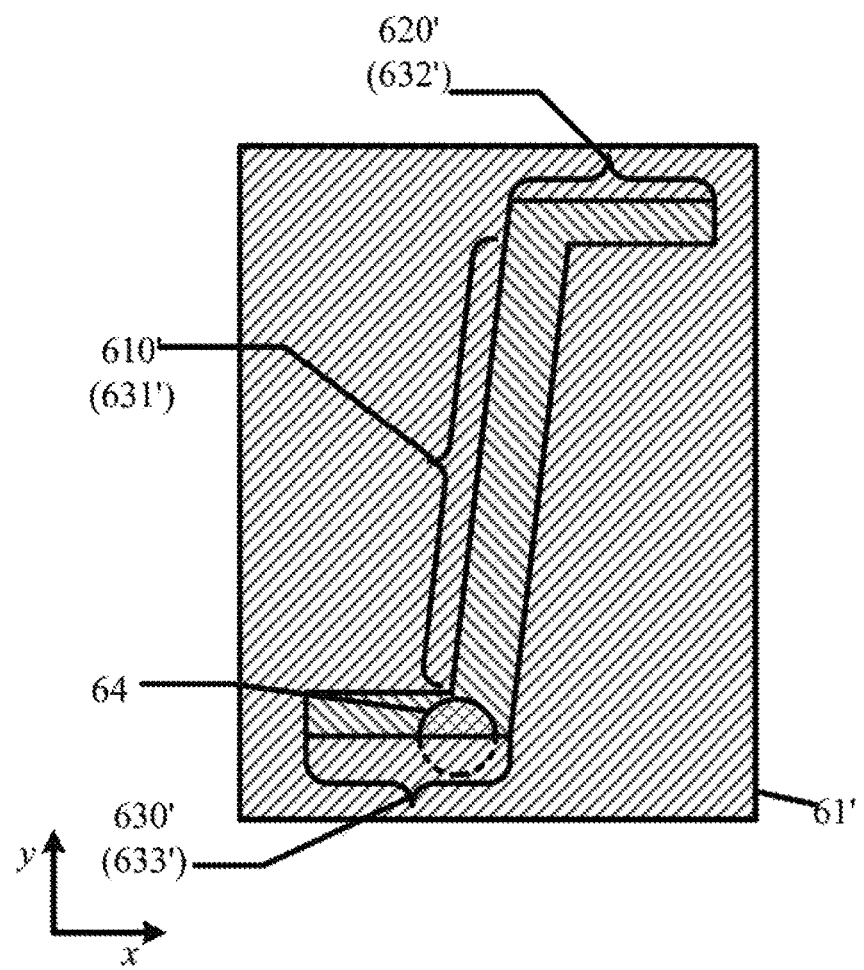
FIG. 6D shows a spatial relationship between the orthogonal projections of a second branch electrode and a third branch electrode of the second electrode to the base substrate as shown in FIG. 6C and the orthogonal projections of the second opening area and the third opening area of the first electrode to the base substrate as shown in FIG. 6A.

In some embodiments, another schematic structure of the second electrode is shown in FIG. 6C. The second electrode 63 includes a strip-shaped second branch electrode 632 and a strip-shaped third branch electrode 633. FIG. 6D shows a spatial relationship between the orthogonal projections of the second branch electrode and the third branch electrode of the second electrode (as shown in FIG. 6C) to the base substrate and the orthogonal projections of the second opening area and the third opening area of the first electrode (as shown in FIG. 6A) to the base substrate. As shown in FIG. 6D, the orthogonal projections 632' and 633' of the second branch electrode 632 and the third branch electrode 633 of the second electrode 63 the base substrate both fall within the orthogonal projection 61' of the first electrode 61 to the base substrate, and respectively coincide with the orthogonal projections 620' and 630' of the second opening area 620 and the third opening area 630 to the base substrate. In some embodiments, as shown in FIG. 6C, the second electrode 63 further includes a strip-shaped first branch electrode 631. As shown in FIG. 6D, the orthogonal projection 631' of the first branch electrode 631 of the second electrode 63 to the base substrate coincides with the orthogonal projection 610' of the first opening area 610 of the first electrode 61 to the base substrate. That is, the area covered by the second branch electrode 632 and the third branch electrode 633 of the second electrode may be equal to the area covered by the second opening area 620 and the third opening area 630, thereby facilitating the formation of the electric field parallel to the y-axis direction between the second electrode and the first electrode 61 through the second opening area 620 and the third opening area 630 of the first electrode 61.

Figure 6E:
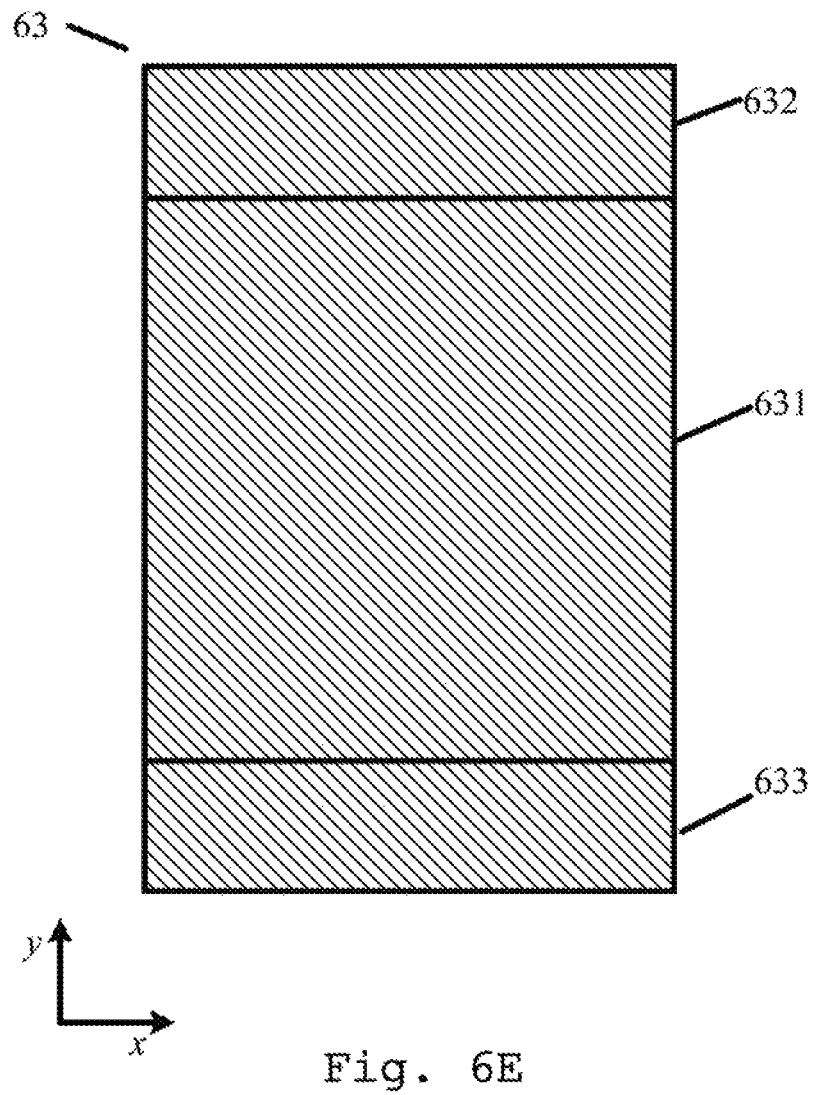
FIG. 6E shows still another schematic structural view of the second electrode.
Figure 6F:
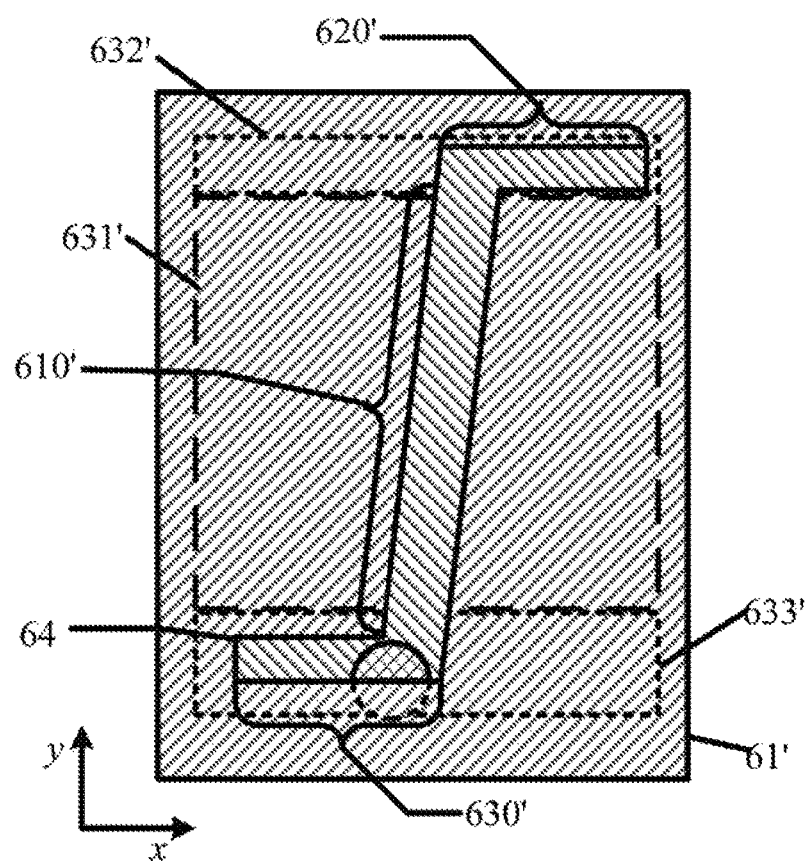
FIG. 6F shows a spatial relationship between the orthogonal projections of the first electrode and its second opening area and third opening area to the base substrate as shown in FIG. 6A and the orthogonal projections of the second branch electrode and the third branch electrode of the second electrode to the base substrate as shown in FIG. 6E.

In some embodiments, yet another schematic structure of the second electrode is shown in FIG. 6E. The second electrode 63 includes a rectangle-shaped second branch electrode 632 and a rectangle-shaped third branch electrode 633. FIG. 6F shows the spatial relationship between the orthogonal projections of the first electrode and its second opening area and third opening area (as shown in FIG. 6A) to the base substrate and the orthogonal projections of the second branch electrode and the third branch electrode of the second electrode (as shown in FIG. 6E) to the base substrate. As shown in FIG. 6F, the orthogonal projections 632' and 633' of the second branch electrode 632 and the third branch electrode 633 of the second electrode to the base substrate both fall within the orthogonal projection 61' of the first electrode 61 to the base substrate, and respectively cover at least the orthogonal projections 620' and 630' of the second opening area 620 and the third opening area 630 to the base substrate. in some embodiments, as shown in FIG. 6E, the second electrode 63 can further include a rectangle-shaped first branch electrode 631. As shown in FIG. 6F, the orthogonal projection 631' of the first branch electrode 631 of the second electrode 63 to the base substrate covers at least the orthogonal projection 610' of the first opening area 610 of the first electrode 61 to the base substrate. That is, the area covered by the second branch electrode 632 and the third branch electrode 633 of the second electrode is greater than or equal to the area covered by the second opening area 620 and the third opening area 630 of the first electrode 61. When the area covered by the second branch electrode 632 and the third branch electrode 633 of the second electrode 63 is greater than the area covered by the second opening area 620 and the third opening area 630 of the first electrode 61, it is conducive to the formation of a storage capacitor. The area covered by the second branch electrode 632 and the third branch electrode 633 of the second electrode 63 can be set according to the requirements for the capacitance value of the storage capacitor.

It should be noted that FIGS. 6C to 6F merely illustrate the shapes of the second branch electrode 632 and the third branch electrode 633 of the second electrode 63 and the spatial relationship between the second branch electrode 632 and the third branch electrode 633 and the second opening area 620 and the third opening area 630 of the first electrode 61 as shown in FIG. 6A. It will be understood that the second branch electrode 632 and the third branch electrode 633 of the second electrode 63 may have any shapes, and the second electrode 63 may further include any branch electrodes, as long as the orthogonal projections of the second branch electrode 632 and the third branch electrode 633 of the second electrode 63 to the base substrate cover the orthogonal projections of the second opening area 620 and the third opening area 630 of the first electrode 61 to the base substrate, which is within the scope claimed by the present disclosure.

In some embodiments, the array substrate can further include a through hole through which the drain electrode of the thin film transistor is electrically connected to the second electrode. As shown in FIGS. 6D and 6F, the orthogonal projection 64 of the through hole to the base substrate at least partially covers the orthogonal projection 630' of the third opening area 630 of the first electrode 61 to the base substrate.

Those skilled in the art will understand that, the array substrate in the present disclosure may further include other structures, in addition to the pixel units and the first electrode and second electrode located in pixel units as described in the above embodiments. For example, the array substrate may further include an insulation layer between the first electrode and the second electrode.

Figure 7:
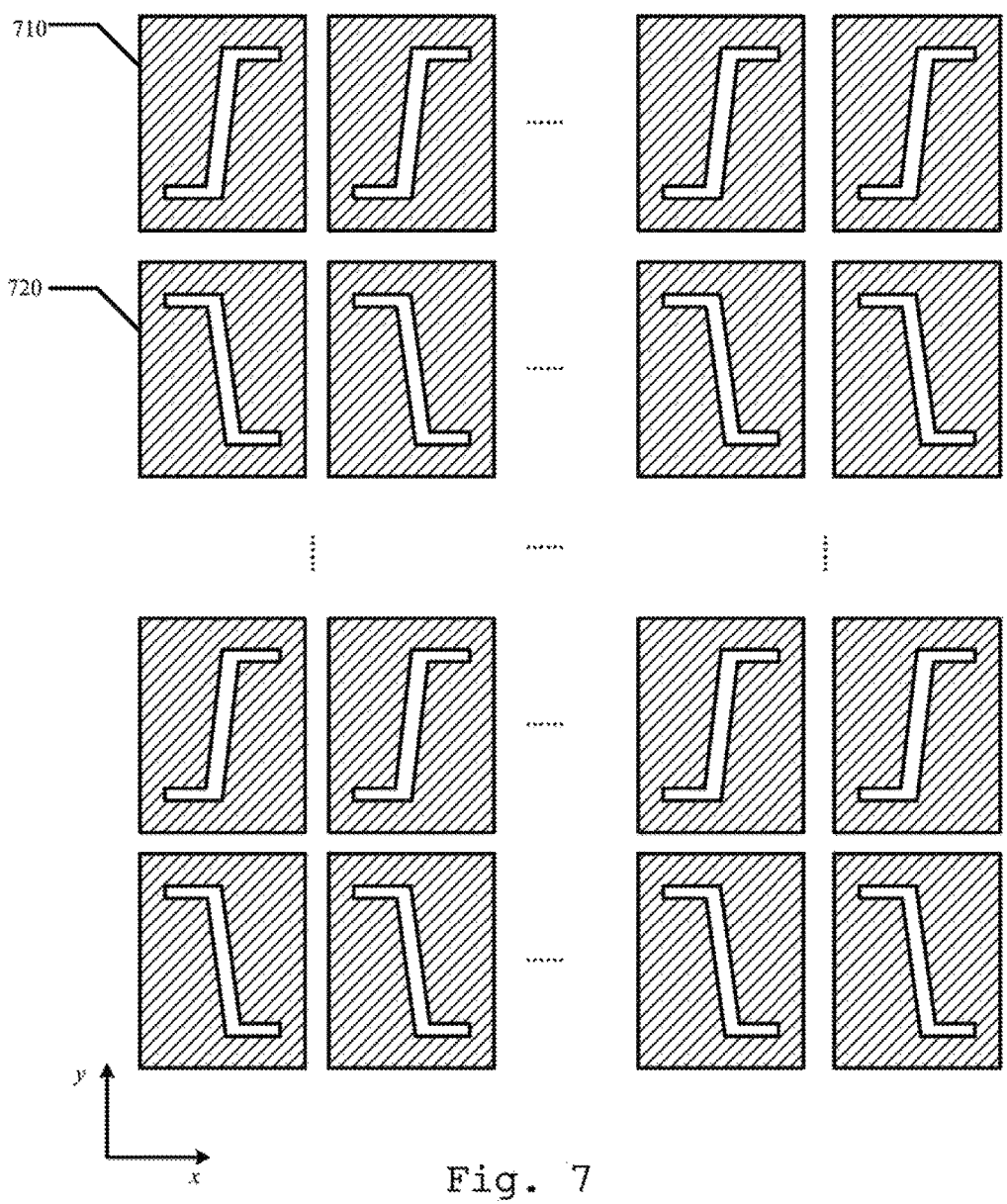
FIG. 7 shows an array arrangement of the first electrodes on the array substrate according to yet another embodiment.

In some alternative implementations, the first electrodes in embodiments of the present disclosure can be arranged in an array on the array substrate, and may have the structure shown in FIG. 7.

Specifically, the extension directions of the first opening area, the second opening area and the third opening area of the first electrodes adjacent to each other along the direction parallel to the y-axis are axis-symmetrical about the direction parallel to the x-axis.

As shown in FIG. 7, the extension directions of the first opening area of the first electrodes 710 and 720 adjacent to each other along the direction parallel to the y-axis are axis-symmetrical about the direction parallel to the x-axis. In the array of the first electrodes shown in FIG. 7, the second opening areas and the third opening areas of the first electrodes extend along the direction parallel to the y-axis. In this way, two adjacent rows of the pixel units may form a pseudo dual-domain structure, thereby overcoming the color deviation of the display panel.

It should be noted that, although the first electrode 710 in FIG. 7 has a structure similar to that in the embodiment shown in FIG. 6A, it is only illustrative. Those skilled in the art will understand that a plurality of first electrodes as shown in FIG. 3A may be arranged in an array according to the arrangement manner shown in FIG. 7, such that the extension directions of the first opening areas of adjacent first electrodes parallel to the y-axis direction are axis-symmetrical about the direction parallel to the x-axis.

The present disclosure also provides a display panel, which includes the array substrate as described above, a color film substrate disposed opposite to the array substrate, and a liquid crystal layer formed between the array substrate and the color film substrate. The liquid crystal molecules in the liquid crystal layer may be negative liquid crystal molecules or positive liquid crystal molecules.

In one embodiment, the array substrate further includes an alignment layer. The alignment layer covers all the pixel units, and has an alignment direction parallel to the array substrate.

When the first electrode in the array substrate has the structure as shown in FIG. 3A or FIG. 6A and the liquid crystal molecules are negative liquid crystal molecules, the alignment direction of the alignment layer may be the direction parallel to the x-axis as shown in FIG. 3A and FIG. 6A.

In some embodiments, when the first electrode in the array substrate has the structure as shown in FIG. 3A or FIG. 6A and the liquid crystal molecules are positive liquid crystal molecules, the alignment direction of the alignment layer may be the direction parallel to the y-axis as shown in FIG. 3A and FIG. 6A.

The present disclosure can further disclose a display device, which includes the above-described display panel. In addition, those skilled in the art may understand that the display device of the present disclosure may include, in addition to the display panel, some other conventional structures, such as an integrated circuit chip for providing corresponding display signals to the display panel. To avoid obscuring the essence of the present disclosure, detailed description of the conventional structures is omitted.

The above merely describes embodiments of the present disclosure and the applied technical principles. Those skilled in the art will understand that the inventive scope involved in the present disclosure is not limited to the technical solutions assembled using specific combinations of the above technical features, but should cover other technical solutions formed by any combinations of the above technical features or equivalent features thereof without departing from the inventive concept of the present disclosure, for example, the technical solutions formed by replacing the above features with technical features having similar functions as disclosed in (not limited to) the present disclosure.

What is claimed is:

1. An array substrate, comprising a base substrate, a plurality of pixel units disposed on the base substrate, and a first electrode and a second electrode disposed within the pixel units; wherein
   the first electrode is disposed above the second electrode;
   the first electrode comprises a strip-shaped first opening area extending along a first direction, the first opening area comprising a first end and a second end;
   an orthogonal projection of a transmitting area of the pixel units to the base substrate covers an orthogonal projection of a part of the first opening area between the first end and the second end to the base substrate; and
   an orthogonal projection of a non-transmitting area of the pixel units to the base substrate covers orthogonal projections of the first end and the second end to the base substrate,
   wherein the array substrate further comprises scan lines and data lines intersecting with each other, the first electrode further comprises a strip-shaped second opening area in communication with the first end and a strip-shaped third opening area in communication with the second end, the second opening area and the third opening area extend along the extension direction of the scan lines, and the second opening area and the third opening area are respectively located at two opposite sides of the first opening area.

2. The array substrate according to claim 1, wherein a width of the strip-shaped first opening area is greater than or equal to 1.5 μm, and less than or equal to 4.5 μm.

3. The array substrate according to claim 2, wherein the width of the strip-shaped first opening area is greater than or equal to 3 μm, and less than or equal to 4 μm.

4. The array substrate according to claim 1, wherein an angle α between the first direction and an extension direction of the scan lines satisfying: $75°\leq\alpha\leq86°$.

5. The array substrate according to claim 1, wherein the first electrode is a common electrode, and the second electrode is a pixel electrode.

6. The array substrate according to claim 5, wherein the second electrode comprises a first branch electrode, and an orthogonal projection of the first branch electrode to the base substrate covers at least an orthogonal projection of the first opening area to the base substrate.

7. The array substrate according to claim 6, wherein the orthogonal projection of the first branch electrode to the base substrate coincides with the orthogonal projection of the first opening area to the base substrate.

8. The array substrate according to claim 5, further comprising a thin film transistor array layer, the thin film transistor array layer comprising a plurality of thin film transistors corresponding to the pixel units, wherein the thin film transistors comprises a drain electrode in electrical connection with the second electrode, and wherein an orthogonal projection of a part of the drain electrode in electrical connection with the second electrode to the base substrate at least covers the orthogonal projection of a part of the second end of the first opening area to the base substrate.

9. The array substrate according to claim 1, wherein a width of the strip-shaped second opening area is greater than or equal to 1.5 μm, and less than or equal to 4.5 μm; and a width of the strip-shaped third opening area is greater than or equal to 1.5 μm, and less than or equal to 4.5 μm.

10. The array substrate according to claim 1, wherein the second electrode comprises a second branch electrode and a third branch electrode, and orthogonal projections of the second branch electrode and the third branch electrode to the base substrate cover at least orthogonal projections of the second opening area and the third opening area to the base substrate, respectively.

11. The array substrate according to claim 10, wherein the orthogonal projections of the second branch electrode and the third branch electrode to the base substrate coincide with the orthogonal projections of the second opening area and the third opening area to the base substrate, respectively.

12. The array substrate according to claim 1, wherein the orthogonal projection of the non-transmitting area of the pixel units to the base substrate covers the orthogonal projections of the second opening area and the third opening area to the base substrate.

13. The array substrate according to claim 1, further comprising a thin film transistor array layer, the thin film transistor array layer comprising a plurality of thin film transistors corresponding to the pixel units, wherein the thin film transistors comprises a drain electrode in electrical connection with the second electrode, and wherein an orthogonal projection of a part of the drain electrode in electrical connection with the second electrode to the base substrate at least covers the orthogonal projection of a part of the third opening area to the base substrate.

14. A display panel, comprising the array substrate according to claim 1, a color film substrate disposed opposite to the array substrate, and a liquid crystal layer disposed between the array substrate and the color film substrate.

15. The display panel according to claim 14, wherein the liquid crystal layer comprises a negative liquid crystal;
- the array substrate further comprises an alignment layer covering the first electrode; and
- an alignment direction of the alignment layer is parallel to an extension direction of the scan lines.

16. The display panel according to claim 14, wherein the liquid crystal layer comprises a positive liquid crystal;
- the array substrate further comprises an alignment layer covering the first electrode; and
- an alignment direction of the alignment layer is parallel to an extension direction of the data lines.

17. A display device, comprising the display panel according to claim 14.

* * * * *